US006782697B2

(12) United States Patent
Mather

(10) Patent No.: US 6,782,697 B2
(45) Date of Patent: Aug. 31, 2004

(54) PRESSURE-COMPENSATING VALVE WITH LOAD CHECK

(75) Inventor: Daniel T. Mather, Lockport, IL (US)

(73) Assignee: Caterpillar Inc., Peoria, IL (US)

( * ) Notice: Subject to any disclaimer, the term of this patent is extended or adjusted under 35 U.S.C. 154(b) by 33 days.

(21) Appl. No.: 10/227,379

(22) Filed: Aug. 26, 2002

(65) Prior Publication Data

US 2003/0121256 A1 Jul. 3, 2003

Related U.S. Application Data

(60) Provisional application No. 60/342,857, filed on Dec. 28, 2001.

(51) Int. Cl.[7] .................................... F16D 31/02

(52) U.S. Cl. .............................. 60/422; 60/452; 91/445

(58) Field of Search .......................... 60/422, 426, 452, 60/468; 91/445, 446, 447, 448

(56) References Cited

U.S. PATENT DOCUMENTS 5,067,389 A 11/1991 St. Germain ................. 91/446
5,077,972 A 1/1992 Bianchetta et al. ........... 60/427
5,251,444 A * 10/1993 Ochiai et al. ................. 60/452
5,291,821 A * 3/1994 Yamashita et al. ............ 91/447
5,890,362 A 4/1999 Wilke .......................... 60/427
6,082,106 A * 7/2000 Hamamoto .................. 60/422
6,334,308 B1 * 1/2002 Sato et al. .................... 60/422

* cited by examiner

*Primary Examiner*—Edward K. Look
*Assistant Examiner*—Igor Kershteyn
(74) *Attorney, Agent, or Firm*—J. W. Burrows; Finnegan, Henderson, Farabow, Garret & Dunner; D. James Barnes

(57) ABSTRACT

In a fluid system, a source of pressurized fluid operably communicates with first and second actuators. First and second control valves control fluidly communicates with the first and second actuators. A first pressure compensating valve fluidly communicates with the first control valve and first actuator. A first signal conduit fluidly communicates with fluid flow being directed by the first control valve to the first pressure compensating valve and first actuator. A second pressure compensating valve fluidly communicates with the second control valve and second actuator. A second signal conduit fluid communicates with fluid flow being directed by the second control valve to the second pressure compensating valve and second actuator. A control signal pressure generated from a greater of a first signal pressure carried by the first signal conduit and a second signal pressure carried by the second signal conduit fluidly communicates with the first and second pressure compensating valves.

20 Claims, 2 Drawing Sheets

PRESSURE-COMPENSATING VALVE WITH LOAD CHECK

CROSS REFERENCE TO RELATED APPLICATIONS

This application claims the benefit of U.S. Provisional Application No. 60/342,857, filed on Dec. 28, 2001, the contents of which are hereby incorporated by reference.

TECHNICAL FIELD

This invention relates generally to a fluid control system and, more particularly, to a pressure-responsive hydraulic system including a pressure-compensating valve with load check.

BACKGROUND

It is well known that when operating two different fluid circuits in parallel with a common pump, the circuit having the lightest load will automatically take the pump's flow. Likewise, the circuit with the heaviest load will stall or slow to such an extent that the operation of that circuit is severely hampered. Thus, in a hydraulic system with a single pump supplying flow to multiple circuits in parallel, it is desirable to provide a control valve that will meter pump flow to the cylinders independent of the load on the cylinder.

In some conventional fluid control systems, a compensator may be disposed between the meter-in directional control area on a main control spool and an actuator conduit. The compensator regulates the pressure of the flow of oil coming from the meter-in flow control area as needed, such that all fluid circuits will experience the same load pressure and command the same flow as the circuit with the highest load pressure. When all the circuits have equal load pressure, the flow being supplied from the pump to the actuators is proportional to the commanded flow and independent of the load on the cylinder.

For example, U.S. Pat. No. 5,890,362 discloses a pressure-compensated hydraulic system where the valve section of each fluid circuit has a pressure-compensating valve. However, because the pump flow is being used to operate the pressure compensation mechanism and provide a control signal, pressurized fluid flow is being taken away from the actuators. Also, this directional control valve has a relatively complicated stem structure and requires additional machining to vent the bridge passage to tank when the control valve is in neutral.

The present invention is directed to overcoming one or more of the problems set forth above.

SUMMARY OF THE INVENTION

According to one aspect of the invention, a fluid system may include a source of pressurized fluid in operable communication with a first actuator and a second actuator. First and second control valves may be operable to control fluid communication to and from the first and second actuators. A first pressure compensating valve may be in fluid communication with the first control valve and the first actuator, and a first signal conduit may be in fluid communication with fluid flow being directed by the first control valve to the first pressure compensating valve and the first actuator. A second pressure compensating valve may be in fluid communication with the second control valve and the second actuator, and a second signal conduit may be in fluid communication with fluid flow being directed by the second control valve to the second pressure compensating valve and the second actuator. A greater of a first signal pressure carried by the first signal conduit and a second signal pressure carried by the second signal conduit may be used to generate a control signal pressure, and the control signal pressure may be in fluid communication with the first pressure compensating valve and the second pressure compensating valve.

According to another aspect of the invention, a method of operating a hydraulic system having more than one actuator supplied by a single source of pressurized fluid is provided. The method may include supplying pressurized fluid to a first actuator via a first control valve and a first pressure compensating valve and supplying pressurized fluid to a second actuator via a second control valve and a second pressure compensating valve. The method may also include generating a first control signal pressure from pressurized fluid being directed by the first control valve to the first pressure compensating valve and generating a second control signal pressure from pressurized fluid being directed by the second control valve to the second pressure compensating valve. The method may still further include generating a control signal pressure from a greater of the first control signal pressure and the second control signal pressure and directing the control signal pressure to the first and second pressure compensating valves to affect fluid flow to the first and second actuators.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
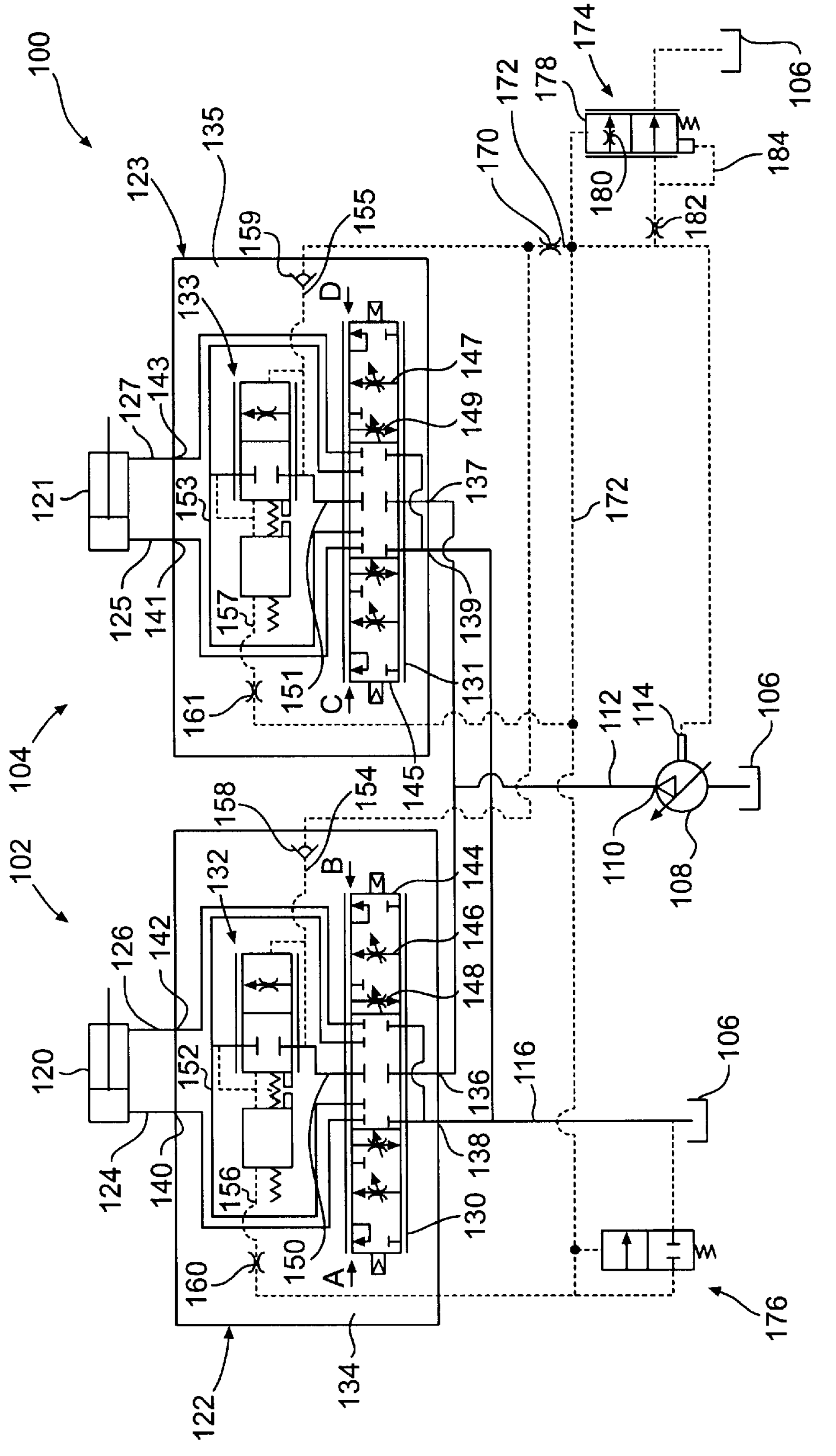
FIG. 1 is a schematic illustration of a hydraulic circuit in accordance with an exemplary embodiment of the present invention.

Referring to FIG. 1, an exemplary pressure-responsive hydraulic system 100 may include a pair of work circuits 102, 104, a tank 106, and a load-sensing, variable-displacement pump 108 connected to the tank 106. The pump 106 may have a discharge port 110 connected to the work circuits 102, 104 in a parallel flow relationship through a common supply conduit 112. The pump may include a pressure-responsive displacement controller 114 for controlling fluid flow through the discharge port 110 and supply conduit 112. An exhaust conduit 116 may be connected to the tank 106 and both work circuits 102, 104.

The work circuit 102 may include an actuator 120, for example, a double-acting hydraulic cylinder, and a control valve 122 connected thereto through a pair of actuator conduits 124, 126. The work circuit 104 similarly includes an actuator 121, for example, a double acting hydraulic cylinder, and a control valve 123 connected thereto through a pair of actuator conduits 125, 127. Both control valves 122, 123 may be connected to the supply conduit 112 and to the exhaust conduit 116.

The control valve 122 may include a directional control valve 130 and a pressure-compensating valve 132, both of which may be housed in a common body 134. The body 134 has an inlet port 136 connected to the supply conduit 112, an exhaust port 138 connected to the exhaust conduit 116, and a pair of actuator ports 140, 142 connected to the actuator conduits 124, 126, respectively.

The directional control valve 130 may include a valve member 144 having an infinitely variable meter-in orifice 146 and an infinitely variable meter-out orifice 148. The valve member 144 is movable from the neutral position shown in FIG. 1 to an infinite number of variable operating positions in directions A and B, with the size of the metering orifices 146, 148 being controlled by the extent to which the valve member 144 is moved from the neutral position.

The control valve 122 may include a meter-in transfer passage 150 providing fluid communication between the directional control valve 130 and the pressure-compensating valve 132. A return passage 152 may provide fluid communication from the pressure-compensating valve 132 back to the directional control valve 130 for routing to a working chamber of the actuator 120. A load pressure signal conduit 154 may be associated with the transfer passage 150, and a control pressure conduit 156 may be associated with the pressure-compensating valve 132. The control valve may include a check valve 158 associated with the load pressure signal conduit 154 and an orifice 160 associated with the control pressure conduit 156.

Similarly, the control valve 123 may include a directional control valve 131 and a pressure-compensating valve 133, both of which may be housed in a common body 135. The body 135 has an inlet port 137 connected to the supply conduit 112, an exhaust port 139 connected to the exhaust conduit 116, and a pair of actuator ports 141, 143 connected to the actuator conduits 125, 127, respectively.

The directional control valve 131 may include a valve member 145 having an infinitely variable meter-in orifice 147 and an infinitely variable meter-out orifice 149. The valve member 145 is movable from the neutral position shown in FIG. 1 to an infinite number of variable operating positions in directions C and D, with the size of the metering orifices 147, 149 being controlled by the extent to which the valve member 145 is moved from the neutral position.

The control valve 123 may include a meter-in transfer passage 151 providing fluid communication between the directional control valve 131 and the pressure-compensating valve 133. A return passage 153 may provide fluid communication from the pressure-compensating valve 133 back to the directional control valve 131 for routing to a working chamber of the actuator 121. A load pressure signal conduit 155 may be associated with the transfer passage 151, and a control pressure conduit 157 may be associated with the pressure-compensating valve 133. The control valve may include a check valve 159 associated with the load pressure signal conduit 155 and an orifice 161 associated with the control pressure conduit 157.

The load pressure signal conduits 154, 155 from the work circuits 102, 104 may be in fluid communication with one another upstream of a signal orifice 170. A signal conduit 172 is disposed downstream of the signal orifice 170. The signal conduit 172 may be in fluid communication with the control pressure ports 156, 157 of the work circuits 102, 104 and the pressure-responsive displacement controller 114. The hydraulic system 100 may include a sink valve 174 and a signal relief valve 176 associated with the signal conduit 172. The sink valve 174 may include a valve member 178 having an infinitely variable metering orifice 180. Another orifice 182 may be associated with a sink supply conduit 184.

Figure 2:
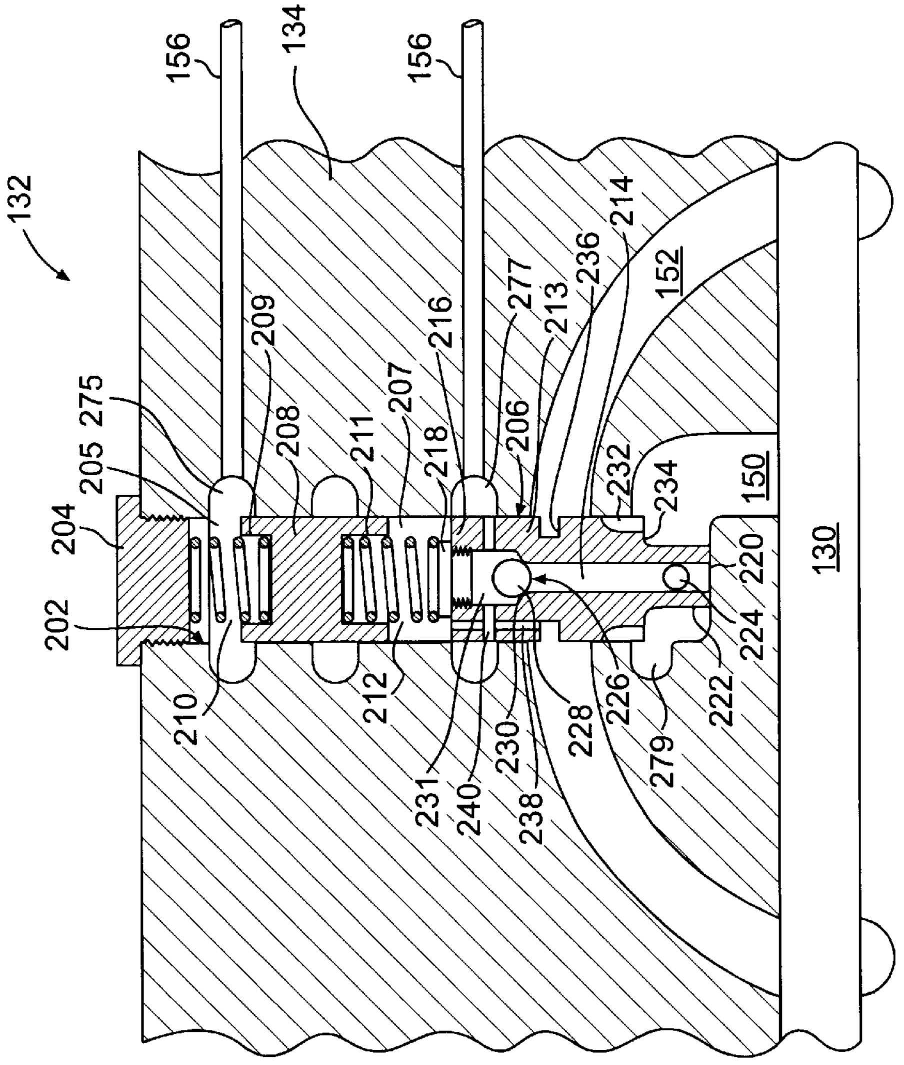
FIG. 2 is a diagrammatic illustration of an exemplary pressure compensation valve with load check from the circuit shown in FIG. 1.

Referring now to FIG. 2, the pressure-compensating valve 132 may be disposed in a bore 202 in the body 134. The bore 202 may be closed at one end by a plug 204. The plug 204 may be mounted in the bore 202 by a screw thread or any other conventional connection. The pressure-compensating valve 132 may include a load check portion 206 and a resolver piston 208. A first chamber 205 may be defined between the resolver piston 208 and the plug 204, and a second chamber 207 may be defined between the load check portion 206 and the resolver piston 208. The first chamber 205 may be in fluid communication with a first annulus 275 and the second chamber 207 may be in fluid communication with a second annulus 277. The first annulus 275 may be in fluid communication with the control pressure conduit 156, and the second annulus 277 may be in fluid communication with load pressure signal conduit 154.

The resolver piston 208 may be H-shaped, for example, so that it may abut the plug 204 at one end or the load check portion 206 at the other end. The resolver piston 208 may be urged away from the plug 204 by a balancing spring 210. The balancing spring 210 may be at least partially disposed, for example, in a first cutout 209 of the resolver piston 208. A load check spring 212 may be disposed between the resolver piston 208 and the load check portion 206. The load check spring 212 may be at least partially disposed, for example, in the opposed cutout 211 of the resolver piston 208. The load check spring 212 may exert a lesser force against the resolver piston 208 than the balancing spring 210.

The load check portion 206 may include a spool 213 including a central, longitudinal throughbore 214 closed at a first end 216 by a plug 218. The plug 218 may be mounted in the throughbore 214 by a screw thread or any other conventional connection. The second end 220 of the throughbore 214 may be open. The end 222 of the spool 213 opposite the load check spring 212 may be narrower than the remainder of the spool 213. One or more radial holes 224 may be cut into the spool 213 at the end 222. The holes 224 may provide fluid communication between a third annulus 279 and the throughbore 214. The third annulus 279 may in fluid communication with the meter-in transfer passage 150.

A signal check 226 including, for example, a ball 228 and a seat 230, may be disposed in the throughbore 214. The plug 218 and the seat 230 may cooperate to form a third chamber 231.

The spool 213 may include one or more slots 232 at a shoulder 234 of the spool 213 near the end 222. The spool 213 may also include an annular groove 236 in a central portion thereof. The annular groove 236 may be in fluid communication with the return passage 152. A longitudinal passage 238 in the spool 213 may provide fluid communication between the annular groove 236 and the second chamber 207. Two or more radial passages 240 may provide fluid communication between the third chamber 231 and the second annulus 277. The spool 213 may include, for example, four passages spaced 90° apart.

Industrial Applicability

In the use of the present invention, the operator can actuate one or both of the hydraulic actuators 120, 121 by manipulating the appropriate directional control valve 130, 131. For example, if the operator wishes to extend the hydraulic actuator 120, the valve member 144 of the directional control valve 130 is moved rightward in the direction of arrow A.

With this exemplary embodiment, the following events sequentially occur when the valve member 144 is moved in direction A. Fluid communication is established between the inlet port 136 and the meter-in transfer passage 150 and between the rod end actuator conduit 126 and the exhaust port 138. Also, the return passage 152 from the pressure compensating valve 132 is placed in fluid communication with the head end actuator conduit 124.

If the operator wishes to retract the hydraulic actuator 120, the valve member 144 of the directional control valve 130 is moved leftward in the direction of arrow B. In this exemplary embodiment, when the valve member is moved in direction B, fluid communication is established between the inlet port 136 and the meter-in transfer passage 150 and between the head end actuator conduit 124 and the exhaust port 138. Also, the return passage 152 from the pressure compensating valve 132 is placed in fluid communication with the rod end actuator conduit 126.

The hydraulic actuator 120 may be operated contemporaneously with or at a different time that the hydraulic actuator 121. If the operator wishes to extend the hydraulic actuator 121, the valve member 145 of the directional control valve 131 is moved rightward in the direction of arrow C. When the valve member 145 is moved in direction C. Fluid communication is established between the inlet port 137 and the meter-in transfer passage 151 and between the rod end actuator conduit 127 and the exhaust port 139. Also, the return passage 153 from the pressure compensating valve 133 is placed in fluid communication with the head end actuator conduit 125.

If the operator wishes to retract the hydraulic actuator 121, the valve member 145 of the directional control valve 131 is moved leftward in the direction of arrow D. In this exemplary embodiment, when the valve member is moved in direction D, fluid communication is established between the inlet port 137 and the meter-in transfer passage 151 and between the head end actuator conduit 125 and the exhaust port 137. Also, the return passage 153 from the pressure compensating valve 133 is placed in fluid communication with the rod end actuator conduit 127.

When the hydraulic actuators 120, 121 are operated simultaneously, the respective load pressure signal conduits 154, 155 are in fluid communication with one another. As a result, whichever load pressure signal conduit 154, 155 carries a greater signal pressure will unseat the respective check valve 158, 159. The check valve associated with the conduit carrying the lesser signal pressure will remain closed. Since the load pressure signal conduits 154, 155 are in fluid communication with the respective meter-in transfer passages 150, 151, the signal pressure communicated to the signal conduits 154, 155 will be proportionate to the load that each hydraulic actuator 120, 121 is experiencing. Consequently, the signal pressure that unseats the check valve will be associated with whichever hydraulic actuator 120, 121 is experiencing the larger load.

For example, if hydraulic actuator 120 is being operated to dump a load, for example, on a bucket loader, and hydraulic actuator 121 is being operated to lift the load, for example, on the bucket loader, hydraulic actuator 121 may be experiencing a significantly larger load. Thus, the meter-in transfer passage 151 will contain fluid at a greater pressure than the fluid in the meter-in transfer passage 150. As a result, the signal pressure of the load pressure signal conduit 155 will unseat the check valve 159, while the check valve 158 will remain closed.

The pressurized fluid from the work circuit 104 with the highest load flows through the check valve 159 to the signal orifice 170 where the pressure drops across the signal orifice 170. The signal in the signal conduit 172 is generated by using the signal orifice 170 in combination with the sink valve 174. The pressure drop across the signal orifice 170 allows the check valve 159 in the work circuit 104 with the highest load to open. The signal orifice 170 may be sized such that a percentage of the pump margin, for example, about 25% of the pump margin, will drop across the signal orifice 170 when the regulated drain flow passes through. The sink valve 174 provides the regulated drain flow and unloads the signal when all of the directional control valves 132, 133 are in neutral.

The signal pressure in the signal conduit 172 is in fluid communication with the first chamber 205 above the resolver piston 208 of the pressure-compensating valves 132, 133. Thus, the signal pressure in the signal conduit 172 urges the resolver piston 208 toward the load check portion 206 of the pressure-compensating valves 132, 133. The balancing spring 210 above the resolver piston 208 is sized to balance the pressure drop across the signal orifice 170 to ensure that the margins of the work circuits 102, 104 will each be a percentage of the pump margin that corresponds with the pressure drop across the signal orifice 170, for example, 75% of the pump margin.

Since the signal pressure in the signal conduit 172 is in fluid communication with the first chamber 205 above the resolver piston 208 of the pressure-compensating valves 132, 133, each of the hydraulic cylinders 120, 121 operates as if it is experiencing the same load. Thus, the flow to each of the hydraulic cylinders will be proportional to the load as modified by the signal pressure, rather than the load pressure of the respective actuators 120, 121.

The signal pressure in the signal conduit 172 is also in fluid communication with sink valve 174, the relief valve 176, and the pressure-responsive displacement controller 114. Sink valve 174 regulates flow from the signal conduit 172 to the tank 106 and allows venting of fluid when the directional control valves 130, 131 are in neutral. If one of the work circuits 102, 104 bottoms out, the relief valve 176 allows other work circuits to continue operating. The relief valve 176 also limits the signal pressure to prevent the pump 108 from exceeding capacity.

In view of the above, it is readily apparent that the structure of the present invention provides an improved and simplified control valve in which the pressure compensating valve includes a valve element and a resolver piston arranged in end-to-end relationship. The actual load pressure is directed between the valve element and the load piston, while the modified load pressure is transmitted to the other end of the resolver piston. Consequently, in all but the circuit with the highest pressure, the resolver piston makes contact with the check valve and biases the check valve to a closed position. When this occurs, the check valve will only open to allow fluid to flow from the pump to the cylinder, via the directional control valve, if the fluid pressure after the meter-in-control area overcomes the load sense pressure plus the force of the resolver piston biasing spring.

It will be apparent to those skilled in the art that various modifications and variations can be made in the disclosed fluid control system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A fluid system, comprising:

a source of pressurized fluid;

a first actuator in operable communication with the source of pressurized fluid;

a first control valve operable to control fluid communication to and from the first actuator, the first control valve including a first meter-in orifice;

a first pressure compensating valve in fluid communication with the first control valve and the first actuator;

a first meter-in passage directing fluid flow from the first meter-in orifice to the first pressure compensating valve;

a first signal conduit fluidly connected to the first meter-in passage between the first control valve and the first pressure compensating valve, the first signal conduit carrying a first signal pressure;

a second actuator in operable communication with the source of pressurized fluid;

a second control valve operable to control fluid communication to and from the second actuator, the second control valve including a second meter-in orifice;

a second pressure compensating valve in fluid communication with the second control valve and the second actuator; and a second meter-in passage directing fluid flow from the second meter-in orifice to the second pressure compensating valve;

a second signal conduit fluidly connected to the second meter-in passage between the second control valve and the second pressure compensating valve, the second signal conduit carrying a second signal pressure, wherein a greater of the first signal pressure and the second signal pressure is used to generate a control signal pressure, and the control signal pressure is in fluid communication with the first pressure compensating valve and the second pressure compensating valve.

2. The system of claim 1, further including a control signal conduit structured and arranged to provide the control signal pressure to the first pressure compensating valve and the second pressure compensating.

3. The system of claim 2, further including a relief valve in fluid communication with the control signal conduit, the relief valve being structured and arranged to permit one of the first and second actuators to operate when another of the first and second actuators is bottomed out.

4. The system of claim 1, further including an orifice structured and arranged to generate the control signal pressure from the greater of the first signal pressure and the second signal pressure.

5. A fluid system, comprising:

a source of pressurized fluid;

a first actuator in operable communication with the source of pressurized fluid;

a first control valve operable to control fluid communication to and from the first actuator;

a first pressure compensating valve in fluid communication with the first control valve and the first actuator;

a first signal conduit in fluid communication with fluid flow being directed by the first control valve to the first pressure compensating valve and the first actuator, the first signal conduit carrying a first signal pressure;

a second actuator in operable communication with the source of pressurized fluid;

a second control valve operable to control fluid communication to and from the second actuator;

a second pressure compensating valve in fluid communication with the second control valve and the second actuator;

a second signal conduit in fluid communication with fluid flow being directed by the second control valve to the second pressure compensating valve and the second actuator, the second signal conduit carrying a second signal pressure; and a sink valve in fluid communication with a control signal conduit, the sink valve being structured and arranged to regulate flow of the control signal pressure to a fluid reservoir, wherein a greater of the first signal pressure and the second signal pressure is used to generate a control signal pressure, and the control signal pressure is in fluid communication with the first pressure compensating valve and the second pressure compensating valve.

6. A fluid system, comprising:

a source of pressurized fluid;

a first actuator in operable communication with the source of pressurized fluid;

a first control valve operable to control fluid communication to and from the first actuator;

a first pressure compensating valve in fluid communication with the first control valve and the first actuator;

a first signal conduit in fluid communication with fluid flow being directed by the first control valve to the first pressure compensating valve and the first actuator, the first signal conduit carrying a first signal pressure;

a second actuator in operable communication with the source of pressurized fluid;

a second control valve operable to control fluid communication to and from the second actuator;

a second pressure compensating valve in fluid communication with the second control valve and the second actuator; and a second signal conduit in fluid communication with fluid flow being directed by the second control valve to the second pressure compensating valve and the second actuator, the second signal conduit carrying a second signal pressure, wherein a greater of the first signal pressure and the second signal pressure is used to generate a control signal pressure, and the control signal pressure is in fluid communication with the first pressure compensating valve and the second pressure compensating valve, and wherein the first and second pressure compensating valves each include a valve bore, a piston, and a load check portion, the piston and the load check portion being slidable relative to one another in the valve bore.

7. The system of claim 6, wherein each of the first and second pressure compensating valves further includes a chamber in fluid communication with the control signal pressure, the control signal pressure urging the piston toward the load check portion.

8. The system of claim 7, wherein each of the first and second pressure compensating valves further includes a balancing spring urging the piston toward the load check portion.

9. The system of claim 8, wherein each of the first and second pressure compensating valves further includes a load check spring disposed between the piston and the load check portion.

10. The system of claim 9, wherein a force of the balancing spring is greater than a force of the load check spring.

11. The system of claim 6, wherein the load check portion of each of the first and second pressure compensating valves includes at least one slot configured to controllably provide fluid communication between a respective control valve and actuator.

12. The system of claim 6, wherein the load check portion of each of the first and second pressure compensating valves includes a throughbore structured and arranged to form the first and second signal conduits, respectively.

13. The system of claim 6, further including a chamber between the piston and the load check portion, the chamber being in fluid communication with a respective actuator.

14. A method of operating a hydraulic system having more than one actuator supplied by a single source of pressurized fluid, the method comprising:

supplying pressurized fluid to a first actuator via a first control valve and a first pressure compensating valve;

supplying pressurized fluid to a second actuator via a second control valve and a second pressure compensating valve;

generating a first load signal pressure from pressurized fluid in a first meter-in passage directing fluid flow from the first control valve to the first pressure compensating valve;

generating a second load signal pressure from pressurized fluid in a second meter-in passage directing fluid flow from the second control valve to the second pressure compensating valve;

generating a control signal pressure from a greater of the first control signal pressure and the second control signal pressure; and directing the control signal pressure to the first and second pressure compensating valves to affect fluid flow to the first and second actuators.

15. The method of claim 14, further including regulating flow of the control signal pressure to a fluid reservoir.

16. The method of claim 14, further providing a relief valve in fluid communication with the control signal pressure to permit one of the first and second actuators to operate when another of the first and second actuators is bottomed out.

17. The method of claim 14, further including metering fluid flow through the first and second pressure-compensating valves to controllably provide fluid communication between the first control valve and first actuator and between the second control valve and second actuator, respectively.

18. The method of claim 14, wherein said directing includes directing the control signal pressure to a chamber in each of the first and second pressure compensating valves, the control signal pressure urging a piston in a first direction against the supply of fluid to the first and second actuators, respectively.

19. A fluid system, comprising:

a source of pressurized fluid;

a first actuator in operable communication with the source of pressurized fluid;

a first control valve operable to control fluid communication to and from the first actuator;

a first pressure compensating valve in fluid communication with the first control valve and the first actuator;

a first signal conduit in fluid communication with fluid flow being directed by the first control valve to the first pressure compensating valve and the first actuator, the first signal conduit carrying a first signal pressure;

a second actuator in operable communication with the source of pressurized fluid;

a second control valve operable to control fluid communication to and from the second actuator;

a second pressure compensating valve in fluid communication with the second control valve and the second actuator;

a second signal conduit in fluid communication with fluid flow being directed by the second control valve to the second pressure compensating valve and the second actuator, the second signal conduit carrying a second signal pressure;

an orifice structured and arranged to generate a control signal pressure from a greater of the first signal pressure and the second signal pressure;

a control signal conduit structured and arranged to provide the control signal pressure to the first pressure compensating valve and the second pressure compensating; and a sink valve in fluid communication with the control signal conduit, the sink valve being structured and arranged to regulate flow of the control signal pressure to a fluid reservoir.

20. The system of claim 19, wherein the first and second pressure compensating valves each include a valve bore, a piston in the valve bore, a load check portion in the valve bore, the piston and the load check portion being slidable relative to one another, a first chamber in fluid communication with the control signal conduit, the control signal pressure urging the piston toward the load check portion, a balancing spring urging the piston toward the load check portion, and a load check spring disposed between the piston and the load check portion, a force of the balancing spring being greater than a force of the load check spring.

* * * * *